United States Patent
Wang et al.

(10) Patent No.: US 10,482,210 B2
(45) Date of Patent: Nov. 19, 2019

(54) SYSTEM, METHOD, AND COMPUTER READABLE MEDIUM FOR WALKING PADS: FAST POWER- SUPPLY PAD-PLACEMENT OPTIMIZATION

(71) Applicants: Ke Wang, Charlottesville, VA (US); Kevin Skadron, Charlottesville, VA (US); Mircea R. Stan, Charlottesville, VA (US); Runjie Zhang, Charlottesville, VA (US); Brett Meyer, Quebec (CA)

(72) Inventors: Ke Wang, Charlottesville, VA (US); Kevin Skadron, Charlottesville, VA (US); Mircea R. Stan, Charlottesville, VA (US); Runjie Zhang, Charlottesville, VA (US); Brett Meyer, Quebec (CA)

(73) Assignee: University of Virginia Patent Foundation, Charlottesville, VA (US)

( * ) Notice: Subject to any disclaimer, the term of this patent is extended or adjusted under 35 U.S.C. 154(b) by 27 days.

(21) Appl. No.: 15/000,826

(22) Filed: Jan. 19, 2016

(65) Prior Publication Data
US 2016/0210392 A1 Jul. 21, 2016

Related U.S. Application Data

(60) Provisional application No. 62/104,220, filed on Jan. 16, 2015.

(51) Int. Cl.
*G06F 17/50* (2006.01)

(52) U.S. Cl.
CPC ...... *G06F 17/5072* (2013.01); *G06F 17/5036* (2013.01); *G06F 17/5081* (2013.01);
(Continued)

(58) Field of Classification Search
None
See application file for complete search history.

(56) References Cited

U.S. PATENT DOCUMENTS

| 6,523,154 | B2 * | 2/2003 | Cohn | G06F 17/5036 703/14 |
| 6,868,374 | B1 * | 3/2005 | Ditlow | G06F 17/5036 703/18 |

(Continued)

OTHER PUBLICATIONS

Y. Zhong et al., "Fast Placement Optimization of Power Supply Pads," 2007 IEEE, pp. 763-767.*

(Continued)

*Primary Examiner* — Leigh M Garbowski
(74) *Attorney, Agent, or Firm* — Westerman, Hattori, Daniels & Adrian, LLP

(57) ABSTRACT

A virtual force controlled collapse chip connection (C4) pad placement optimization frame-work for 2D power delivery grids is proposed. The present optimization framework regards power pads as mobile "positive charged particles" and current resources as a "negative charged back-ground." The virtual electrostatic force is calculated from voltage gradients. This optimization framework optimizes pad locations by moving pads according to the virtual forces exerted on them by other pads and current sources in the system. Within this framework, three algorithms are proposed to meet various requirements of optimization quality and speed. These algorithms minimize resistive voltage drop (IR drop), the maximum current density, and power distribution network metal power dissipation at the same time.

7 Claims, 10 Drawing Sheets

(52) U.S. Cl.
CPC ........ *G06F 17/504* (2013.01); *G06F 17/5068* (2013.01); *G06F 2217/08* (2013.01); *G06F 2217/78* (2013.01)

(56) References Cited

U.S. PATENT DOCUMENTS

| | | | | |
|---|---|---|---|---|
| 7,823,102 | B2* | 10/2010 | Chandra | G06F 17/5009 716/106 |
| 8,327,306 | B2* | 12/2012 | Oh | G06F 17/5068 716/119 |
| 8,448,118 | B2* | 5/2013 | Graf | H01L 24/48 716/120 |
| 2006/0095870 | A1 | 5/2006 | Tai et al. | |
| 2008/0066026 | A1 | 3/2008 | Tai et al. | |
| 2011/0113398 | A1 | 5/2011 | Keinert et al. | |
| 2015/0370944 | A1* | 12/2015 | Wang | G06F 17/5068 716/132 |

OTHER PUBLICATIONS

M. Zhao et al., "Optimal Placement of Power-Supply Pads and Pins," IEEE Trans. on Computer-Aided Design of Integrated Circuits and Systems, vol. 25, No. 1, Jan. 2006, pp. 144-154.*
R. Zhang et al., "Some Limits of Power Delivery in the Multicore Era," Fourth Workshop on Energy-Efficient Design (WEED 2012), 7 pages.*
K. Shakeri et al., "Compact Physical IR-Drop Models for GSI Power Distribution Networks," 2003 IEEE, pp. 54-56.*
J. Rius, "IR-Drop in On-Chip Power Distribution Networks of ICs With Nonuniform Power Consumption," IEEE Trans. on Very Large Scale (VLSI) Systems, vol. 21, No. 3, Mar. 2013, pp. 512-522.*
H. Qian et al., "Random Walks in a Supply Network," ACM/DAC 2003, pp. 93-98.*
S. Logan et al., "Redundant C4 Power Pin Placement to Ensure Robust Power Grid Delivery," 2013 IEEE, pp. 449-452.*
A. B. Kahng et al., "StochasticPower-Ground Supply Voltage Prediction and Optimization via Analytical Placement," IEEE. Trans. on Very Large Scale (VLSI) Systems, vol. 15, No. 8, Aug. 2007, pp. 904-912.*
J. W. Joyner et al., "A Compact Model for Projections of Future Power Supply Distribution Network Requirements," 2002 IEEE, pp. 376-380.*
G. Huang et al., "Compact Physical Models for Power Supply Noise and Chip/Package Co-Design of Gigascale Integration," 2007 Electronic Components and Technology Conference, IEEE, pp. 1659-1666.*
G. Huang et al., "Compact Physical Models for Chip and Package Power and Ground Distribution Networks for Giigascale Integration (GSI)," 2008 Electronic Components and Technology Conference, IEEE, pp. 646-651.*

Y.-L. Chuang et al., "Voltage-Drop Aware Analytical Placement by GLobal Power Spreading for Mixed-Size Circuit Designs," IEEE Trans. on Computer-Aided Design of Integrated Circuits and Systems, vol. 20, No. 11, Nov. 2011, pp. 1649-1662.*
T. Yu et al., "A Novel and Efficient Method for Power Pad Placement Optimization," 14the Int'l Symposium on Quality Electronic Design, 2013 IEEE, pp. 158-163.*
N.R. Quinn, Jr. et al., "A Force Directed Component Placement Procedure for Printed Circuit Boards," IEEE Trans. on Circuits nad Systems, vol. CAS-26, No. 6, Jun. 1979, pp. 377-388.*
C.-H. Lu et al., "Package Routability—and IR-Drop-Aware Finger/ Pad Assignment in Chip-Package Co-Design," 2009 EDDA, 6 pages.*
F. Mo et al., "A Force-Directed Macro-Cell Placer," 2000 IEEE, pp. 177-180.*
T. Sato et al., "Successive pad assignment algorithm to optimize number and location of power supply pad using incremental matrix inversion," ASP-DAC 2005 IEEE, pp. 723-728.*
M. Zhao et al., "Optimal Placement of POwer Supply Pads and Pins," ACM-DAC 2004, pp. 165-170.*
K. Shakeri et al., "Compact Physical IR-Drop Models for Chip/ Package Co-Design of Gigascale Integration (GSI)", IEEE Trans. on Electron Devices, vol. 52, No. 6, Jun. 2005, pp. 1087-1096.*
L.A. Arledge, Jr. et al., "Scaling and Performance Implications for Power Supply and Other Signal Routing Constraints Imposed by I/O Pad Limitations," 1998 IEEE Symposium on IC/Packaging Design Integration, 6 pages.*
T. Chan et al., "Multilevel Generalized Force-directed Method for Circuit Placement," 2005 ACM, pp. 185-192.*
P. Gupta et al., "Efficient Design and Analysis of Robust Power Distribution Meshes," 2006 IEEE Proc. of the 19th Int'l COnference on VLSI Design, 6 pages.*
M. Gupta et al., "Understanding Voltage Variations in Chip Multiprocessors using a Distributed Power-Delivery Network," 2007 EDAA, 6 pages.*
F. Mohamood et al., "Noise-Direct: A Technique for Power Supply Noise Aware Floorplanning Using Microarchitecture Profiling," 2007 IEEE, pp. 786-791.*
J. Singh et al., "A Fast Algorithm for Power Grid Design," 2005 ACM, 8 pages.*
M. Zhao et al., "Hierarchical Analysis of Power Distribution Networks," IEEE Trans on Computer-Aided Design of Integrated Circuits and Systems, vol. 21, No. 2, Feb. 2002, pp. 159-168. (Year: 2002).*
H. Qian et al., "Power Grid Analysis Using Random Walks," IEEE Trans on Computer-Aided Design of Integrated Circuits and Systems, vol. 24, No. 8, Aug. 2005, pp. 1204-1224. (Year: 2005).*
C. Jiao et al., "Implementation of Random Walk Algorithm by Parallel Computing," 2012 9th Int'l Conference on Fuzzy Systems and Knowledge Discovery (FSKD 2012), IEEE, pp. 2477-2481. (Year: 2012).*

* cited by examiner (a) Uniform
(S-Uni)

(b) Half-half
(S-HH)

(c) Checked
(S-CB)

(d) 3-Level 1
(S-TL1)

(e) 3-Level 2
(S-TL1)

(f) 3-Level 3
(S-TL1)

SYSTEM, METHOD, AND COMPUTER READABLE MEDIUM FOR WALKING PADS: FAST POWER- SUPPLY PAD-PLACEMENT OPTIMIZATION

RELATED APPLICATION

This application claims priority to U.S. Provisional Application No. 62/104,220, "System, Method, and Computer Readable Medium for Walking Pads: Fast Power-Supply Pad-Placement Optimization," filed Jan. 16, 2015, which application is incorporated by reference herein in its entirety.

BACKGROUND

In modern system-on-chip design, supply-voltage-noise induced reliability issues are becoming increasingly challenging due to increase in current density (Document 1). Among the various sources of voltage noise. IR drop refers to the resistive voltage drop across metal wires in the power delivery network (PDN). Typical design rules tolerate an IR drop ratio no more than 5% of supply voltage, and violations can lead to timing errors.

In a flip-chip design, because the underlying silicon chip has a non-uniform power dissipation, the number and locations of controlled-collapse-chip-connection (C4) pads connecting to the on-chip PDN have a large impact on the IR drop. Thus, optimizing both the number and locations of power supply C4 pads becomes critical to guarantee the desired IR drop target. Moreover, given the fact that both power supply and signal I/O share the same physical interface—C4 pads—determining the minimum number of power pads required for a given chip design through such optimization can help a designer to determine the available I/O bandwidth, or even perform tradeoffs between I/O bandwidth and the IR drop target.

Previous works have addressed a pad placement optimization for the purpose of minimizing IR drop (Documents 2-4). However, their approaches have scalability limitations, and as a result, they are not suitable for the large pad placement design space of modern systems. Some other works provide analytical methods to estimate the maximum IR drop when pad number and pad locations are given (Documents 5 and 6). It is known that no existing work investigates the minimum number of C4 pads required to satisfy a target IR drop in a 2D PDN grid.

In the present invention, a fast method is proposed to obtain the minimum pad number for a target IR drop and corresponding optimized pad locations.

First, a new method of power pad placement optimization, Walking Pads (WP), is introduced. The key idea behind WP is to convert a global optimization problem (the placement of n pads given m candidate locations) into a local balance problem (the placement of individual pads (current sources) with respect to various nearby current demands). Treating pads as "mobile positive charges" and the on-chip PDN grid as a 2D electrostatic voltage field, WP optimizes pad locations by letting each of the pads "walk" in the direction of the total virtual force exerted upon it to achieve local force balance.

WP achieves significant speedup over existing methods in the literature, because it has two significant advantages:

WP leverages the underlying voltage gradients to quickly identify promising pad locations; and WP allows all pads to step toward their balanced positions simultaneously, reducing algorithm complexity significantly as a function of target pad count.

Second, an analytical formula is derived to describe the relationship between IR drop and pad number based on optimized pad locations. While not a closed-form model, the proposed analytical formula only requires that three coefficients to be fitted to a curve, and can predict the optimal pad count to within an error of two pads for systems with 128-1024 pads. When combined with WP, the proposed analytical formula can quickly and accurately predict the minimum required pad count.

The present invention makes two principal contributions:

WP is proposed, and it is demonstrated that it achieves at least 100× speedup with respect to the classical simulated annealing (SA) methods in the literature, while sacrificing no more than 0. 1% VDD in steadystate IR drop; and An analytical formula, that describes the relationship between the number of pads and the expected maximum IR drop assuming optimized pad locations, is proposed.

Together, the analytical model and WP algorithm are positioned to significantly accelerate the optimization of power pad count and placement, and therefore, create new opportunities for joint optimizations.

RELATED WORKS

Sato et al. proposed the Successive Pad Assignment (SPA) method of power pad location optimization for pad ring allocation (Document 3). Zhao et al. provided a solution of mixed integer linear program (MILP) for pad ring allocation (Document 2). The computational complexities of both SPA and MILP grow quickly as problem size increases. As a result, they are not tractable for large scale 2D C4 arrays. Zhong and Wong proposed a fast power pad placement optimization algorithm within the framework of simulated annealing (SA) (Document 4). This method localizes the effect of pad movement using a node-based iterative method and therefore, improves the performance of each SA iteration. However, the localization is based on the hypothesis that the voltages of pad-PDN connection points cannot affect each other. This is not true when the package circuit and pad resistance are considered. Furthermore, their approach sacrifices accuracy when accelerating calculations (Document 4), and cannot work with other efficient numerical methods like preconditioned Krylov subspace methods (Document 7).

Shakeri proposed a theoretical method of accurate IR drop estimation for uniform power consumption floorplans with uniformly distributed pads (Document 5). Rius extended this work to a closed-form expression for non-uniform power consumption floorplans with arbitrary pad counts and locations (Document 6). However, Rius' work is based on the assumption that power pads are uniformly distributed on as rectangular 2D array. It is noted that IR drop is systematically overestimated in this case relative to the expected IR drop of optimally placed pads.

Lu et al. proposed electrostatics based placement using Nesterov's Method called ePlace (Document 24). In addition, Yu et al. proposed a novel and efficient method for power pad placement optimization method (UIUC algorithm) (Document 25). However, these two proposed methods are different from the method proposed in the present application as discussed below. Both the proposed method and ePlace use electrostatic force to direct the placement of electric units. The ePlace deals with transistor level placement which is a continuous optimization problem. The proposed method deals with discrete optimization problems because of the discrete available, locations on the C4 interface. The most significant difference is that ePlace uses a purely artificial electrostatic force which has no direct relation to their real problem. The electrostatic force adopted by the proposed method comes from the math formula of the real problem. Both UIUC algorithm and the proposed, method deal with the exactly same problem. UIUC algorithm uses graph-based algorithm, and the proposed method adopts physics-based algorithm.

The developed Walking Pads and the analytical model, unlike any prior work, enable designers to efficiently determine, the relationship between pad count and IR drop, and therefore optimal pad allocation. Such an approach is critical for pre-RTL design, as the number of pads required for power delivery affects the number of pads available for I/O, and therefore has implications for system architecture and microarchitecture.

DOCUMENT LISTS

1. Mikhail Popovich, Audrey V. Mezhiba, and Eby G. Friedman. *Power distribution networks with on-chip decoupling capacitors*, Springer, New York; London, 2008.
2. Min Zhao, Yuhong Fu, Vladimir Zolotov, Savithri Sundareswaran, and Rajendran Panda. Optimal placement of power supply pads and pins. *Proc. DAC '04*, pp. 1.65-170, New York, N.Y., USA, 2004. ACM.
3. T. Sato, Hidetoshi Onodera, and M. Hashimoto. Successive pad assignment algorithm to optimize number and location of power supply pad using incremental matrix inversion. *Proc. ASP-DAC '05*, vol. 2, pp. 723-728, 2005.
4. Yu Zhong and Martin D. F. Wong. Fast placement optimization of power supply pads. Proc. *ASP-DAC '07*, pp. 763-767. Washington, D.C., USA, 2007.
5. K. Shakeri and J. D. Meindl. Compact physical IR-drop models for chip/package co-design of gigascale integration (GSI). *IEEE Transactions on Electron Devices*, vol. 52(6), pp. 1087-1096, 2005.
6. J. Rius, IR-Drop in on-chip power distribution networks of ICs with nonuniform power consumption. *IEEE Transactions on Very Large Scale integration (VLSI) Systems*, vol. 21(3), pp. 512-522, 2013.
7. Jianlei Yang, Zuowei Li, Yici Cai, and Qiang Zhou, PowerRush: a linear simulator for power grid. In *ICCAD '11*. pp. 482-487, 2011.
8. Meeta S. Gupta, Jared L. Oatley, Russ Joseph, Gu-Yeon Wei, and David M. Brooks. Understanding voltage variations in chip multiprocessors using a distributed power-delivery network. In *Proc. DATE '07*, pp. 624-629, San Jose, Calif., USA, 2007.
9. Runjie Zhang, Brett H. Meyer, Wei Huang, Kevin Skadron, and Mircea R. Stan. Some limits of power delivery in the multicore era. *WEED*, Oregon, USA, 2012.
10. Xiaoye S. Li. An overview of SuperLU: algorithms, implementation, and user interface. *ACM Trans. Math. Softw.*, vol. 31(3), pp. 302-325, 2005.
11. Joseph W. H. Liu. Modification of the minimum-degree algorithm by multiple elimination. *ACM Trans. Math. Softw.*, vol. 11(2), pp. 141-153, 1985.
12. Zhuo Li, Raju Balasubramanian, Frank Liu, and Sani Nassif. 2011 TAU power grid simulation contest: benchmark suite and results. In Proc. *ICCAD '11*, pp. 478-481, Piscataway, N.J., USA, 2011.
13. Andrew B. Kahng, Bao Liu, and Qinke Wang. Stochastic power/ground supply voltage prediction and optimization via analytical placement. *IEEE Trans. Very Large Scale Integr. Syst.*, vol. 15(8), pp. 904-912, 2007.
14. David J. Griffiths, *Introduction to Electrodynamics*. Addison-Wesley, 4 edition, October 2012.
15. Yi-Lin Chuang, Po-Wei Lee, and Yao-Wen Chang. Voltage-drop aware analytical placement by global power spreading for mixed-size circuit designs. *IEEE Transactions on Computer-Aided Design of Integrated Circuits and Systems*, 30(11):1649-1662, 2011.
16. Sheng Li, Jung-Ho Ahn, R. D. Strong, J. B. Brockman, D. M. Tullsen, and N. P. Jouppi. McPAT: an integrated power, area, and timing modeling framework for multicore and manycore architectures. *MICRO-42*, pp. 469-480, 2009.
7. A. M. Joshi, L. Eeckhout, L. K. John, and C. Isen. Automated microprocessor stressmark generation. *HPCA 2008*, pp. 229-239, 2008.
18. Gregory G. Faust, Runjie Zhang, Kevin Skadron, Mircea R. Stan, and Brett H. Meyer. ArchFP: rapid prototyping of pre-RTL floorplans. *VLSI-SoC*, pp. 183-188. IEEE, 2012.
19. ITRS, 2011, http://www.itrs.net.
20. S. Reda, C. J. Alpert, P. G. Villarrubia, A. B. Kahng. A fast hierarchical quadratic placement algorithm. *IEEE Transactions on Computer-Aided Design of Integrated Circuits and Systems*, 25(4), 678-691, 2006.
21. U.S. Patent Application Publication No. US 2011/0113398 A1, Keinert, et al., "Method and System for Providing Secondary Power Pins in Integrated Circuit Design, May 12, 2011.
22. U.S. Patent. Application Publication No. US 2006/0095870 A1, Tai, et al., "Power Network Analyzer for an Integrated Circuit Design, May 4, 2006.
23. U.S. Patent Application Publication No. US 2008/0066026 A1, Tai, et al., "Power Network Analyzer for an Integrated Circuit Design, Mar. 13, 2008.
24. http://vlsi-cuda.ucsd.edu/ljw/Placement/
25. Ting Yu and Martin D. F. Wong. A novel and efficient method for power pad placement optimization. 14*th Int'l Symposium on Quality Electronic Design*, pp. 158-163, 2013.

SUMMARY

An aspect of an embodiment of the present invention provides, among other things, a virtual force controlled collapse chip connection (C4) pad placement optimization framework for 2D power delivery grids. The present optimization framework regards power pads as mobile "positive charged particles" and current resources as a "negative charged background." The virtual electrostatic force is calculated from voltage gradients. This optimization framework optimizes pad locations by moving pads according to the virtual forces exerted on them by other pads and current sources in the system. Within this framework, three algorithms (and related method and system), among other things, are provided to meet various requirements of optimization quality and speed. These algorithms (and related method and system) minimize resistive voltage drop (IR drop), the maximum current density, and power distribution network metal power dissipation at the same time.

Another aspect of an embodiment of the present invention provides for, among other things, power pad placement of power delivery networks (PDN), which is important in computer-automated-design (CAD) of integrated circuits. Still more particularly, another aspect, of an embodiment of the present invention relates optimization of power pad locations.

Another aspect of an embodiment of the present invention provides, among other things, an optimization framework (called Walking Pads, WP) that identifies the similarity between the 2D PDN on-chip voltage field and a 2D electrostatic system voltage field. This is a novel and advantageous aspect of the placement algorithm—utilizes virtual electrostatic force to direct pad movement to minimize the maximum IR drop of PDN. This allows pads to move large distances in a single iteration of the placement algorithm.

Another aspect of an embodiment of the present invention provides, but not limited to, a method that takes full use of, among other things, underlying physical information. In contrast, all of the existing methods (Documents 12, 15, and 16) use generic optimization methods and regard the PDN as a black box.

Another aspect of an embodiment of the present invention, walking pads (WP) provides a number of advantages. WP achieves significant speedup over existing methods in the literature and includes the following advantages:
  WP leverages the underlying voltage gradients to quickly identify promising pad locations and potentially allow pads to move large distances in a single iteration of the algorithm;
  WP-Neighbor (WP-N) and WP-Freezing (WP-F) allow all pads to simultaneously step toward their balance position, slowing the growth in algorithm;
  WP-Refine algorithm (and related method and system) ranks pads by their distances to the maximum IR drop location and moves nearby pads at first.

It should be appreciated that using the same idea and framework as disclosed herein, WP algorithms (and related method and system) can be extended to transistor cell placement; and therefore be employed within the context of the present invention.

Another aspect of various embodiments of the present invention may be utilized for a number of products and services including power deliver network design and CAD-tools.

BRIEF DESCRIPTION OF THE DRAWINGS

For a better understanding of the aforementioned embodiments of the invention as well as additional embodiments thereof, reference should be made to the Description of Illustrative Embodiments below, in conjunction with the following drawings in which like reference numerals refer to corresponding parts throughout the figures.

DESCRIPTION OF ILLUSTRATIVE EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Problem Formulation
Power Delivery Network Model

Figure 1:
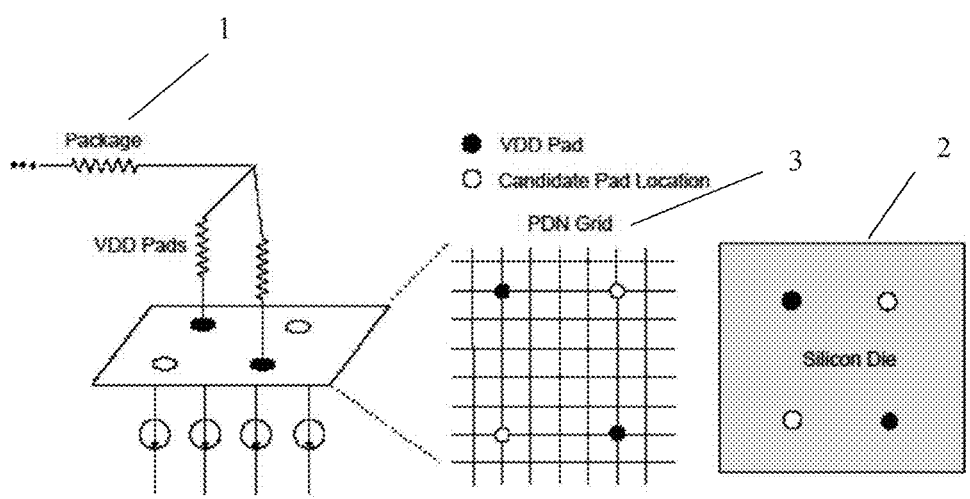
FIG. 1 illustrates a model of 2D PDN in accordance with some embodiments.

The typical regularity of the on-chip PDN's physical structure makes compact PDN modeling feasible. A well accepted methodology models the multi-layer metal stack as a 2D resistor mesh (Document 8). C4 pads are modeled as individual resistors attached to on-chip grid nodes 3, and the relative locations of those connection points in the grid represent the actual locations of the C4 pads on the silicon die 2. Ideal current sources are used to model the load (i.e., switching transistors). Off-chip components like the package 1 or printed circuit board (PCB) are lumped into single resistors. It is noted that lumped package models are adopted in most current related work. This methodology is adopted, and the model skeleton as in FIG. 1 is built (Document 9). It is assumed that the PCB represents an ideal power supply, and lumped package resistors, pad resistors, and on-chip 2D resistor mesh are simultaneously modeled. The solved steady state equations therefore capture not only the on-chip 2D resistor mesh, but the package and pad resistances as well, with the latter elements changing as pads move from one candidate location to another. The present method is not limited to the model of PCB board.

To solve for voltage and current values in the model circuit, sparse LU decomposition with pivoting, using SuperLU, is employed (Document 10). A direct solver with pivoting is generally considered a numerically stable and accurate method, and protects optimization quality from numerical errors. When implemented using advanced reordering techniques (Document 11), sparse LU reduces memory usage significantly and achieves adequate performance for use in the experiments. It is worth noting that the proposed Walking Pad algorithm framework is a high level optimization framework, is thus not restricted to a particular numerical method, and therefore, can take advantage of ongoing advances in numerical methods (Documents 7 and 12).

Power Pad Location Optimization

Given the system floorplan, the number of power pads to place, and system power trace, the objective of power pad location optimization is to identify grid locations, at which to place pads in order to minimize the maximum observed IR drop. The site of C4 bumps restricts the locations where they may be placed. It is assumed that power pads can be allocated on a coarse pad grid that depends on the ratio of pad pitch and metal pitch. Each possible allocation of a set of power pads to grid locations is called a configuration. The total number of configurations is the binomial coefficient of the number of pad locations and number of pads, and is larger than $10^{200}$ in the case studies considered in present invention (and larger than $10^{1400}$ for a scaled system). In this context, effective and computationally efficient search techniques are needed to rapidly identify pad allocations that achieve near-optimal IR drop.

Walking Pads

The key idea behind WP is to convert a global optimization problem (the placement of n pads given m candidate locations) into a local balance problem (the placement of individual pads (current sources) with respect to various nearby current demands). To find the proper virtual force for local balance, it is first observed that there is a similarity between the 2D PDN on-chip voltage field and a 2D electrostatic voltage field. The steady state equation of a voltage field can be regarded as the finite-difference version of the 2D Poisson equation (Documents 5 and 13):

$$\frac{\partial^2 V}{\partial x^2} + \frac{\partial^2 V}{\partial y^2} = I_{xy} R, \quad (1)$$

where V is the on-chip voltage field, $I_{xy}$ is the workload current density at point (x, y) and R is the resistance per unit length in the x and y directions. Gauss's law of electrostatic systems can be similarly described (Document 14):

$$\frac{\partial^2 \tilde{V}}{\partial x^2} + \frac{\partial^2 \tilde{V}}{\partial y^2} = \frac{\rho_{xy}}{\varepsilon_{xy}}, \quad (2)$$

where $\vec{V}$ is the electrostatic field, and $\rho_{xy}$ and $\varepsilon_{xy}$ are the charge density and permittivity at point (x, y). It is noted that in the present invention, the case, where R is the same in the x and y directions, is only considered. WP algorithms are also suitable if on-chip resistance is anisotropic.

When viewing pad placement as a 2D electrostatic voltage field problem, the current in the PDN is analogous to the electric flux lines in an electrostatic system, which are proportional to the voltage gradient, in this way, power pads can be regarded as "positive point charges" that source currents, and the underlying architectural, blocks in the processor system can be regarded as "negative surface changes" that sink currents. Like charges repel each other, while unlike charges attract each other. Therefore, the voltage gradient at as pad location is defined as the virtual force to direct pad movement.

In this context, Walking Pads allows pads to move in reaction to the forces exerted on them by current sources and other pads in the PDN: the pads "walk," toward the locations where these forces balance. No matter where the pads are placed, the total current through all pads is invariant. However, when pads reach their balanced positions, the gradient of the voltage field (directly proportional to the current) in each direction is equalized. Therefore, the currents are uniformly distributed across pads and the on-chip PDN wires connected to the pads. As a result, the maximum resistive voltage drop of the on-chip PDN is minimized.

WP also minimizes the maximum on-chip current density and PDN metal power dissipation at the same time. On-chip maximum current always occurs in those wires directly connected to a pad; the maximum on-chip current density is therefore also minimized by WP because WP minimizes the current through these wires. PDN metal power dissipation is an analogue to the total energy of the electrostatic system. Therefore, the PDN metal power dissipation is also reduced when pads move under virtual forces, and is minimized when all forces on surface charges are balanced.

Walking Pads Algorithm Framework

Figure 2:
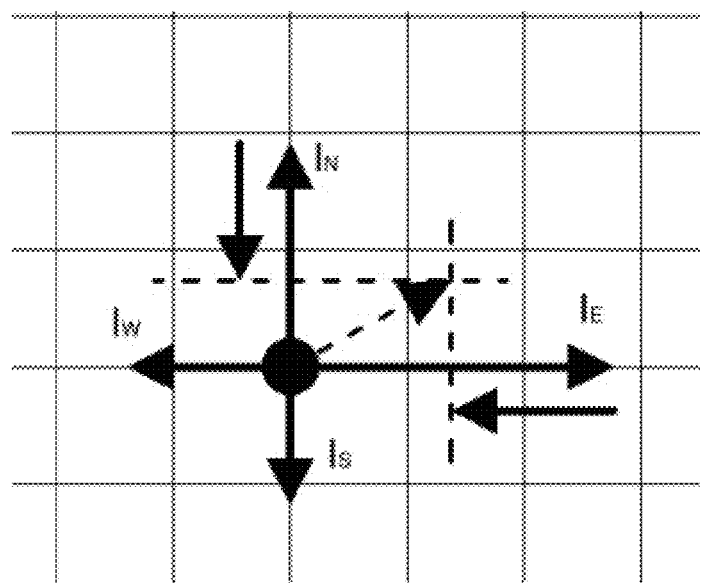
FIG. 2 illustrates a resultant virtual force calculation in accordance with some embodiments.

The resultant force is the vector summation of four currents in east, west, north, and south directions (FIG. 2).

An iteration of a Walking Pads algorithm uses three steps to incrementally move all pads toward their balanced positions:

Solve steady state equations;
Calculate virtual farces and decide the direction and distance of movement for each pad based on total forces (the algorithmic complex of this step is O(n), n is the number of the power pads); and
Move pads (the algorithmic complex of this step is O(n), n is the number of the power pads).

Grid voltage and current values are determined in step 1. In step 2, current values are used to guide pad movement. Step 3 moves all pads simultaneously. WP achieves a significant performance improvement over SA by employing a deterministic approach to the selection of pad movement direction and distance in step 2 and allowing all pads to move simultaneously in step 3. As more optimization is achieved with each iteration, fewer iterations are needed.

Efficient Total Force Calculation

Once steady state current and voltages have been calculated for each node in the PDN, WP must determine in which direction to move each pad by computing virtual forces.

An intuitive way to determine the total virtual force on each pad is to apply the law of super-position and sum the contributions of virtual force from all other pads and current sources together. Some previous work uses this approach (Document 15). However, such methods are inherently inefficient due to their complexity. Using Gauss's Law, the force on a pad in one direction can be calculated from the voltage gradient in that direction. In the case of 2D PDN, one pad connects to four lines in the east, north, west and south directions. The resultant force is the vector summation of these four currents. Therefore, this step has linear time complexity against the number of pads (O(n)).

Walking Pads Algorithm Variants

Three variants of Walking Pads are proposed. The first, Walking Pads-Neighbor (WP-N), only allows each of the pads to move to its neighboring location based on a comparison of the strength of vertical and horizontal forces imposed on it: the stronger force determines the direction the pad moves, either up/down or left/right. Because all pads move at the same time and traverse a constant distance—one pad candidate location in the direction of motion—this algorithm results in the oscillation of pad locations around balanced positions. In practice, WP-N regards oscillation as convergence: when oscillation is detected, the algorithm terminates. As a result, WP-N does not perform well, but remains useful for quick, but low-quality, optimization.

The second variant, Walking Pads-Freezing (WP-F), is shown in Algorithm 1. WP-F allows pads to move in an arbitrary direction defined by the normalized virtual force $\vec{F}/\|\vec{F}\|$. Large move distances are also adopted in early iterations. To force pads to stop at approximately balanced positions, a freezing process, which gradually decreases the move distance of each pad, is introduced. The distance a pad moves $D_i$ decreases with the constant freezing rate $\gamma$. WP-F terminates when pads no longer move. The large-step stage of WP-F helps pads to jump out of local minima, while the small-step stage helps pads gradually freeze in their balanced positions.

---

Algorithm 1: Walking Pads - Freezing (WP-F) algorithm.

Set: initial move distance $D_0$, freezing rate $\gamma$
repeat
  | Solve steady state;
  | foreach pad do
  |  | $\vec{F} = (I_{north} - I_{south}, I_{east} - I_{west})$ $D\vec{isp} = \vec{F} / \|\vec{F}\| * D_i$
  | end
  | $D_{i+1} = D_i * \gamma$
until check_converge( ) == True;

---

Walking Pads-Refined (WP-R), is shown in Algorithm 2. The first two versions of WP take advantage of the simultaneous movements of all pads. Simultaneous movements reduce the quality of the solution to some extent, however, because the forces on one pad may change when other pads move. To address this, WP-R performs a greedy search: it moves pads one by one and only accepts movements that decreases the maximum IR drop. For a 2D grid, it is assumed that moving pads near the location of maximum IR drop has greater effect than moving distant ones. To improve efficiency, WP-R sorts the pads by their distances to the maximum IR drop location and lets nearby pads move first. When the location or the value of maximum IR drop changes, WP-R re-sorts the pads and continues. The algorithm terminates when no pad movement improves IR drop. Because of its algorithm complexity, WP-R is used to supplement WP-F or WP-N to further improve the results when high optimization quality is required.

---

Algorithm 2: Walking Pads - Refine (WP-R) algorithm.

Set: $D_0$ = PadPitch, initial maxIRDrop
repeat
  | Sort pads by distance to max IR place → PadList;
  | foreach pad in PadList do
  |  | $\vec{F} = (I_{north} - I_{south}, I_{east} - I_{west})$ $D\vec{isp} = \vec{F} / \|\vec{F}\| * D_0$
  |  | Solve steady state and get new_maxIRDrop;
  |  | if new_maxIRDrop < maxIRRrop then
  |  |  | accept the movement; maxIRRrop = new_maxIRDrop; break;
  |  | else
  |  |  | reject the movement;
  |  | end
  | end
until check_converge( ) == True;

---

Algorithm Complexity Analysis

The worst-case complexity of WP algorithms occurs when a pad must move from an initial position in one corner of the chip (e.g., the left-top corner) to a balanced position in the opposite corner (e.g., the right-bottom). In this case, WP-N requires #grid$_{row}$+#grid$_{column}$−2 iterations to converge. For the practical cases of randomly initialized pad positions, the average number of iterations required is on the order of $B_0$(#grid$_{row}$+#grid$_{column}$−2)/#pad. $B_0$ is larger than 1 for the case that a pad does not move directly from its initial to the balanced position (i.e., it takes a detour).

For a WP-F, the convergence speed is controlled by a freezing rate $\gamma$. The approximate traveling distance of one pad before being frozen is $(D_0 - 0.5\text{pad.pitch})/(1-\gamma)$, where $D_0$ is the initial move distance. Again, to beat the worst case, $D_0$ and $\gamma$ are chosen to make the travel distance of each pad larger than the diagonal length of the grid. In the experiments in the present invention, starting from roughly uniform pad locations results in much faster convergence than this theoretical upper bound. Detours are also possible in the WP-F. In practice, a safety coefficient $C_0$ in the range of 20~4.0 is added to balance the effect of detours and the speedup due to uniform initial positions and get:

$$\frac{D_0 - 0.5\text{pad\_pitch}}{1-\gamma} = C_0 * \sqrt{\#grid_{row}^2 + \#grid_{column}^2}. \qquad (3)$$

An initial move distance $D_0=3*\text{pad\_pitch}$ and a freezing rate $\gamma=0.99$ are chosed for case studies in the present invention. This results in 180 WP-F iterations. The total number of iterations required is independent of the number of pads to be placed.

Experimental Setup

To evaluate WP algorithms in the present invention, their convergence speed and solution quality are compared with the simulated annealing (SA) algorithm proposed by Zhong and Wong (Document 4). For a SA, two cooling rates, 0.98 (practical cooling speed, SA-P) and 0.999 (very slow cooling speed, SA-S), are evaluated for efficiency and quality comparison, respectively. It is observed, that the cooling rate of 0.85 proposed by Zhong and Wong is too fast to produce high-quality results (The SA with 0.85 cooling rate is still slower than the proposed algorithms). In the SA implementation, the square of the worst node voltage, is maximized, and the movement window shrinking strategy proposed in the literature is implemented (Document 4). The SA algorithm is considered converged when the movement window is too small for pads to move.

SA is firstly compared with WP-N and WP-F, and SA is compared with WP-F+WP-R then. To compare WP-R and SA, WP-R iteration is terminated to get results of similar quality as those from SA, and then compare the speedup. To compare with SA-P and SA-S, respectively, WP-F+WP-R-T1, terminates after #pad/2 iterations of WP-R, and WP-P+WP-R-T2 terminates after #pad*8 iterations of WP-R. These cutoffs were determined heuristically to yield similar quality.

A 24-core, Intel Penryn-like multiprocessor at 16 nm technology is selected as the platform to evaluate the above optimization algorithms. To estimate the power consumption for each functional block, McPAT, an architecture-level power model, is used (Document 16). To model the worst-case power dissipation in the system, it is assumed that each architectural unit dissipates 85% of its maximum power (Document 17). A supply voltage of 0.7V is assumed:

architectural floorplans were generated using an architecture-level tool, ArchFP (Document 18). It is assumed that the top metal pitch is 30 μm top layer metal pitch, and that wires in this layer are 6 μm wide and 4 μm thick: this results in a PDN model consisting of a 236 by 296 resistor grid, where each resistor has a resistance of 41 mΩ. It is assumed that the C4 pad pitch is 285 μm, resulting in a grid with 2880 pad candidate locations for the 24-core system. According to ITRS projections, C4 pad density will be held constant in the foreseeable future (Document. 19); the ITRS projection is adopted for pad density in the experiments. All of the experiments are conducted on an Intel Xeon E5-1650 3.20 GHz CPU with 32 GB memory.

Results

WP Speedup and Result Quality

Figure 3:
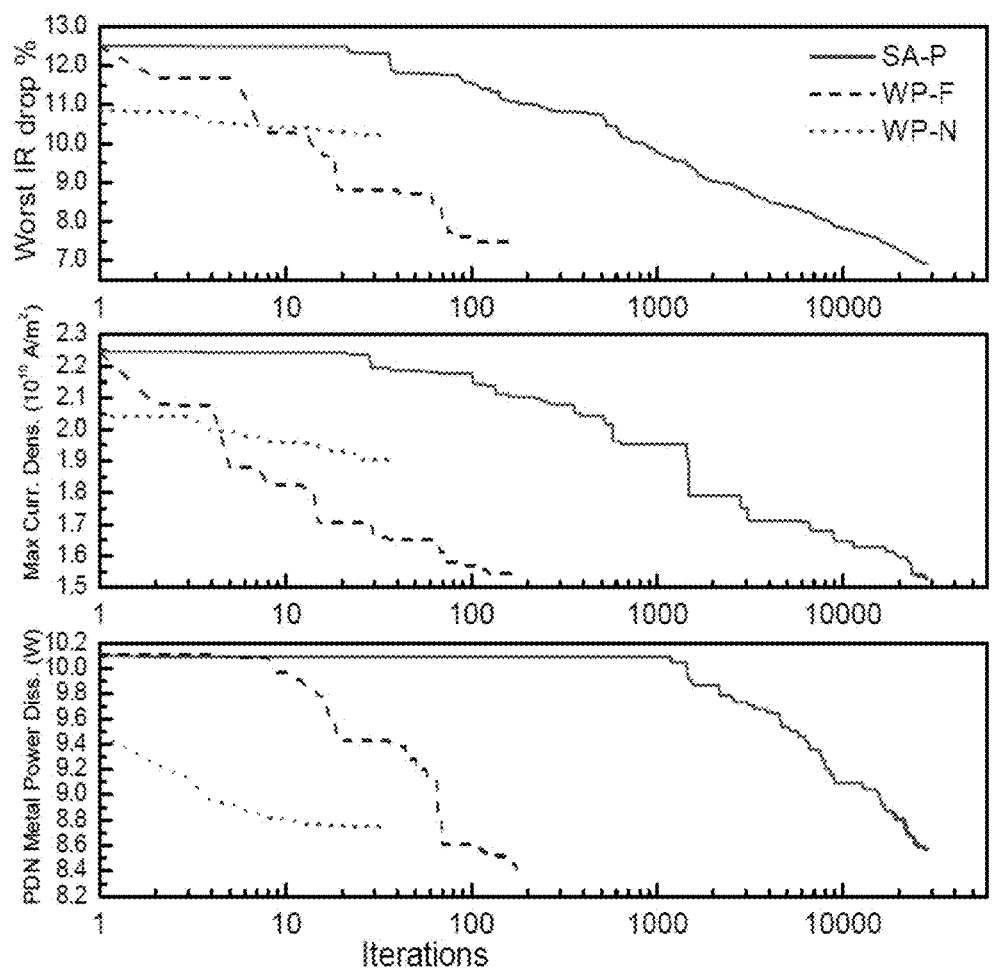
FIG. 3 illustrates WP-F (dotted), WP-N (dashed), and SA (Simulated Annealing) (solid) all jointly optimize IR drop, the maximum current density and power dissipated in on-chip PDN metal, but at different rates and with different effectiveness in accordance with some embodiments. In practice, the techniques above do not monotonically improve each figure of merit. For clarity, the results for the best explored configuration are plotted so far at a given iteration count.

Two basic WP algorithms, WP-N and WP-F, are compared with SA-P; the results of this comparison are illustrated in FIG. 3. FIG. 3 plots algorithm convergence and solution quality for WP-F (dotted line), WP-N (dashed line), and SA-P (solid line) with respect to IR drop, maximum current density and power consumed in PDN metal; iteration count is plotted on the x axis. Iteration counts alone are used to compare the efficiency of each approach because solving for steady state voltage and current values—required by, and equivalent in, each approach—requires over 99.9% of the

TABLE 1

Comparision of different allocation methods

| Method | IR (% VDD) | J ($10^{10}$ A/m²) | P (W) | Iter |
|---|---|---|---|---|
| Uniform | 12.5 | 2.246 | 10.11 | — |
| WP-N | 10.2 | 1.903 | 8.752 | 36 |
| WP-F | 7.5 | 1.543 | 8.365 | 180 |
| SA-P | 6.9 | 1.530 | 8.571 | 28,261 | total time to complete a single iteration in each case. SA, WP-N, WP-F and WP-R have about the same runtime per iteration and memory usage (approximately 0.3 s and 220 MB for the case of 512 pads on 24core floorplan).

In FIG. 3, VDD pads are initially allocated uniformly to every fourth pad candidate location in the vertical and horizontal directions, representing 180 pads among 2880 pad candidate locations. Table 1 summarizes the IR drop (IR), maximum on-chip current density (J), metal power dissipation (P), and required iteration (Iter) for each pad allocation method.

It is observed that uniform pad allocation does not produce good results: SA reduces IR drop by 45% with respect to that from uniform pad location. Furthermore, it is observed that all three algorithms jointly optimize all three metrics, if at different rates, and with differing effectiveness. WP-N converges the fastest, finishing in 20% of the time required for WP-F; however, WP-N converges too quickly to get high-quality results, resulting in an IR drop 48% higher than that produced by SA. WP-F only sacrifices 0.6% VDD in IR drop, but obtains a 157× speedup when compared with SA.

Figure 4:
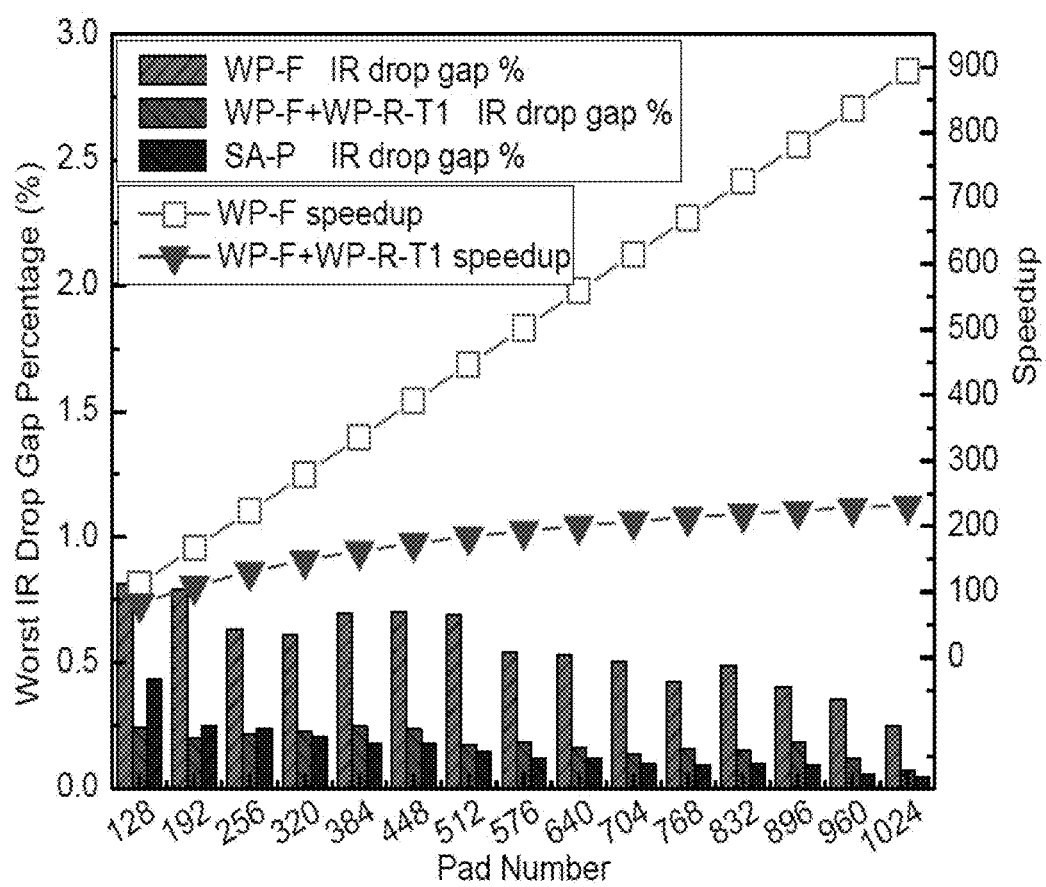
FIG. 4 illustrates a comparison of Walking Pads and simulated annealing: differences in worst IR drop and speedup in accordance some embodiments. WP-R-T1 (terminates after #pad/2) terminates after #pad/2 iterations.

Next, the effect of combining WP-F and WP-R is evaluated to achieve better optimization quality. FIG. 4 plots the IR drop gap and convergence efficiency of WP-F, WP-F+WP-R-T1 (terminates after #pad/2), and SA-P for varying pad counts, relative to the results from SA-S. The pad allocations selected by SA-S are considered the global optimal and are used to evaluate the result quality of other methods. SA-S, which cools at a rate of 0.999 instead of 0.98, needs 3176×#pad iterations to converge while SA-P needs 157×#pad to converge.

Table 2 summarizes the quality and speedup on a 24-core floorplan with 128 to 1024 pads. Four different WP strategies (WP Str)—WP-F, WP-F+WP-R-T1 (F+R-T1, WP-R-T1 terminates

TABLE 2

Comparison of Different Walking Pads Algorithms

| | Speedup (X) | | Max Gap in % VDD | |
|---|---|---|---|---|
| WP Str. | vs SA-P | vs SA-S | vs SA-P | vs SA-S |
| WP-F | 112-893 | — | 0.54 | 0.81 |
| F + R-T1 | 82-232 | — | 0.09 | 0.25 |
| F + R-T2 | — | 337-388 | — | 0.12 |
| F + R | — | 20-220 | — | 0.10 | at #pad/2) WP-F+WP-R-T2 (F+R-T2, WP-R-T2 terminates at #pad*8), and WP-F+WP-R (F+R, no early termination), are investigated. WP-F achieves up to 893× speedup with respect to SA-P, but sacrifices too much quality (0.54% VDD). When refined with WP-R, WP-F+WP-R-T1 achieves up to 232× speedup with respect to SA-P, but produces results matching those from SA-P with a gap less than 0.1% VDD. Therefore, it is believed that WP-F+WP-R-T1 can replace SA-P to obtain optimized pad locations with practical quality. In the case of 832 pads, WP-F+WP-R-T1 requires less than four minutes to achieve results of comparable quality to SA-P after 15 hours. For the same reason, it is believed that WP-F+WP-R-T2 can replace SA-S to obtain intensively optimized pad locations with a speedup in the range of 337-388×. WP-F and WP-R-T1 are not compared with SA-S and WP-R-T2 and WP-R with SA-P.

Synthetic and Sealed System Benchmarks

To demonstrate that WP performs well under a variety of scenarios, a series of benchmarks including (a) six synthetic floorplans (FIG. 5) and (b) three variants of the 24-core system with 16, 32, and 48 cores are developed. The results are summarized in Table 3. For each benchmark (Bench.), the number of pads allocated (# pads), the number of candidate locations (# loc), and the corresponding speedup (Speedup) of WP-F (F), WP-F+WP-R-T1 (R-T1)and the IR drop gap (% Gap) of WP-F (F), WP-F+WP-R-T1 (R-T1) and WP-F+WP-R (R), each relative to SA-P are reported. The IR drop gap between SA-P and WP is calculated as ($IR_{WP}$−$IR_{SA-P}$)/VDD. A negative gap means WP outperforms SA-P.

For the synthetic benchmarks, it is observed that WP-F and WP-R-T1 achieve a speedup

TABLE 3

WP Results for Synthetic and Multi-core Models

| | | | Speedup | | % Gap | | |
|---|---|---|---|---|---|---|---|
| Bench. | # pads | # loc | F | R-T1 | F | R-T1 | R |
| S-Uni | 512 | 4900 | 498 | 206 | 0.18 | −0.03 | −0.11 |
| S-HH | 512 | 4900 | 498 | 206 | 0.23 | −0.03 | −0.11 |
| S-CB | 512 | 4900 | 498 | 206 | 0.20 | −0.06 | −0.12 |
| S-TL1 | 512 | 4900 | 498 | 206 | 0.15 | −0.03 | −0.10 |
| S-TL2 | 512 | 4900 | 498 | 206 | 0.24 | 0.01 | −0.12 |
| S-TL3 | 512 | 4900 | 498 | 206 | 0.19 | −0.03 | −0.11 |
| 16-Core | 512 | 1914 | 375 | 155 | 0.42 | 0.16 | −0.07 |
| 24-Core | 768 | 2880 | 670 | 277 | 0.33 | 0.071 | −0.04 |
| 32-Core | 1024 | 3844 | 961 | 397 | 0.41 | 0.070 | −0.07 |
| 48-Core | 1536 | 5776 | 1536 | 634 | 0.39 | 0.055 | −0.09 | of 498 and 206× relative to SA-P. WP-F and WP-R-T1 further achieve IR drops within 0.25% and 0.01% of SA-P. For the Penryn-like variants, the speedup advantage of WP-F and WP-R-T1 increases as the chip grows, up to 634×, and the IR drop gap for WP-R-T1 shrinks marginally; the IR drop gap for WP-F is relatively constant across chip sizes.

Analytical Model

While the above results show that the WP efficiently places a given number of pads, in many other scenarios, both the number and the locations of the power pads need to be determined. The naive methods require many WP executions to obtain both count and locations of the power pads. To reduce the number of required WP execution significantly, an analytical model capable of predicting the appropriate pad count is developed.

Figure 5:
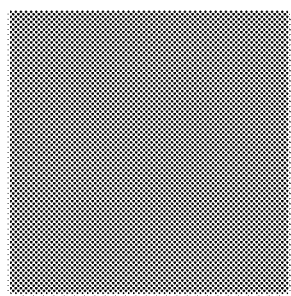
FIG. 5 illustrates a floorplan of each synthetic model is 20×20 mm$^2$ in accordance with some embodiments. 512 pads are allocated to deliver a total of 150 W. In (b), the power density ratio of black to white is 4:1. In (d), (e), and (f) the power density ratio of black, gray and white is 3:2:1.
Figure 5:
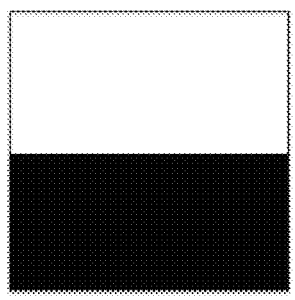
Figure 5:
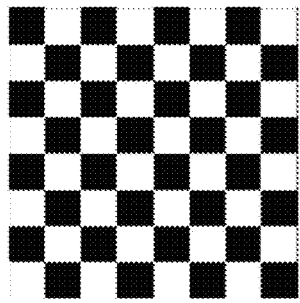
Figure 5:
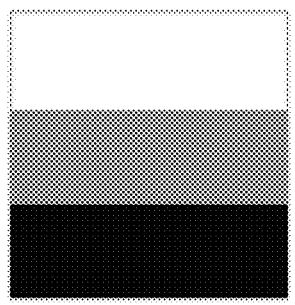
Figure 5:
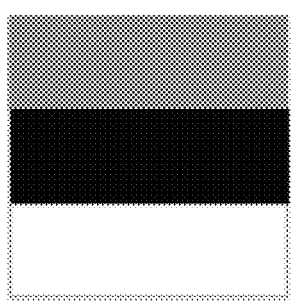
Figure 5:
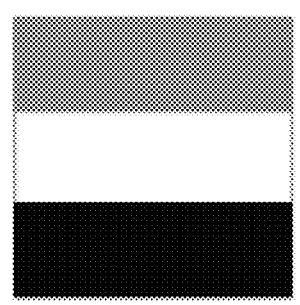
Figure 6:
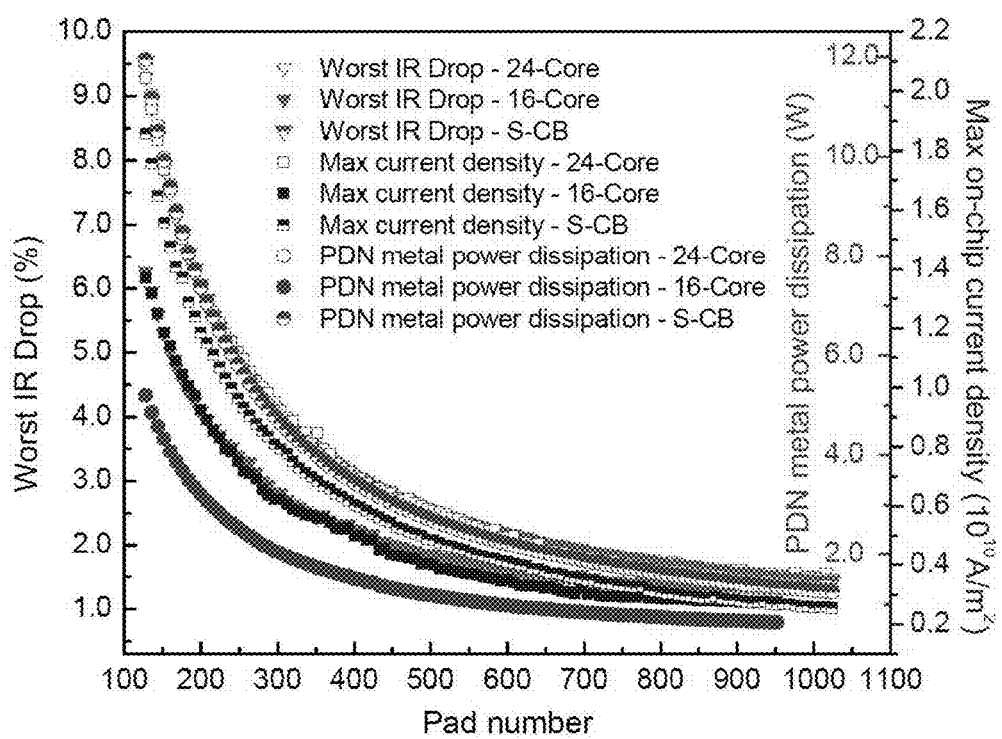
FIG. 6 illustrates a pad number effect on IR drop, the maximum current density and PDN metal power dissipation based on optimized pad locations in accordance with some embodiments. Optimization uses WP-F+WP-R (no early termination) and starts from randomly allocated pads. Points are plotted at a interval of 8 pads in FIG. 6.

FIG. 5 illustrates the relationship between pad count, IR drop, maximum current density, and PDN metal power when pad locations are optimized with WP-R. As the pad count increases, each of the three metrics decreases in a similar way.

To model the relationship between pad count and IR drop, the below conditions are assumed:

The load current density $\rho$ is uniform;
All pad currents are equal; and
Each pad serves a circular area around it with radius $r_0$.
From Gauss's law:

$$\frac{\partial V}{\partial r} = \frac{\pi r_0^2 \rho - \pi r^2 \rho}{2\pi r} * R. \quad (4)$$

Integrating V from ($r_\epsilon$) to $r_0$, the IR drop at $r_0$ is:

$$V|_{r_0} = \frac{\rho R r_0^2}{2}\ln\frac{r_0}{r_\epsilon} - \frac{\rho R}{4}(r_0^2 - r_\epsilon^2) + \frac{I_0 R_P}{N_P} + V_{packagedrop}. \quad (5)$$

where $r_\epsilon$ is the effective radius of pad, and R is the resistance per unit length of on-chip resistor grid. Substituting $$r_0 = \sqrt{\frac{I_0}{\pi \rho N_P}}$$

and substituting for the constant coefficients with a, b, and c:

$$V_{drop} = a\frac{1}{N_P}\log\left(\frac{1}{N_P}\right) + b\frac{1}{N_P} + c. \quad (6)$$

To validate Eq. (6), curve fitting is performed against the IR drop data in FIG. 5, and it is found that $R^2=0.998$ and 0.9998 for the 16-core and 24-core models, respectively. Furthermore, when used to derive the maximum on-chip current density and PDN metal power, fitting Eq. (6) results in $R^2=0.998$ and 0.9999, respectively for the 16-core model, and $R^2=0.9995$ and 0.99997, respectively for the 24-core model. Eq. (6) clearly is effective at predicting each metric as a function of pad count.

To explore the predictive power of the analytical model, four different IR drop budgets are selected for the 24-core system. Eq. (6) is used to estimate the appropriate number of pads, and this is compared with the minimum pad count satisfying the budget. The parameters of Eq. (6) are fitted using three randomly selected pad counts: 200, 520, and 840. The results of this experiment are summarized in Table 4. It is observed that the predicted pad count (Pred.) is within two of the optimal pad count (Optimal) in each case. It is worth noting that even if all pad counts in {128, 136, 1024} are used for curve fitting, the predicted number of pads does not change.

TABLE 4

Predicted and Optimal Pad Count for 24-core Model

| IR Drop Budget | Pred. | Optimal | Actual IR Drop |
|---|---|---|---|
| 5%, 35 mV | 240 | 238 | 34.63 mV |
| 4%, 28 mV | 304 | 306 | 27.97 mV |
| 3%, 21 mV | 416 | 418 | 20.77 mV |
| 2%, 14 mV | 673 | 672 | 13.99 mV |

While validating the analytical model, it is noticed that there is a significant difference between the worst-case IR drop experienced under uniform pad distribution and that experienced when pad locations are optimized. For example, the worst IR drops with uniform pads allocations on a rectangular 2D array are 12.0%, 7.0% and 3.3% for the cases of 180, 320 and 720 VDD pads in the 24-core model. The corresponding worst IR drops with WP-optimized pad allocations are 6.6%, 3.8% and 1.9%, respectively. This suggests that previous analytical models based on uniform pad allocations (e.g., Document 6) systematically overestimate worst-case IR drop.

Future Work

In the present invention, a fast method is described for determining the minimum number of pads required to satisfy an IR drop constraint and their corresponding optimized locations. A novel pad placement optimization framework is introduced fen 2D grids: Walking Pads (WP). Three algorithms are proposed in the WP framework to meet the conflicting requirements of results quality and optimization time. The experimental results show that combining the Walking Pads-Freezing (WP-F) and Walking Pads-Refined (WP-R) algorithms achieves up to 634× speedup when compared with simulated annealing (SA), without sacrificing more than 0.1% VDD in IR drop. The scalability test also shows that speedup and result quality of WP increase as the chip grows. An analytical model is also proposed to describe the relationship between the number of allocated, optimized pads, and resulting IR drop. This model matches WP results well and leads to fast minimum-pad-number determination when working with WP algorithms.

In the present invention, the first step of demonstrating the viability of the WP paradigm is taken. There are several directions for future research using the WP framework: (1) The joint optimization of VDD and GND pad placement should be considered to make further IR drop optimization across both the VDD and GND layers; (2) Spatial constraints in the 2D pad candidate location grid should be considered in WP for the placement of signal pads; (3) WP could be used to support IR-drop-aware floorplanning, by moving 'negative charges' (functional units or standard cells) instead of 'positive changes' (power pads); (4) WP algorithms could be simply extended for through-silicon via (TSV) placement in 3D IC; (5) WP algorithms can be easily extended to temperature-aware placement by replacing the voltage field with a temperature field; and (6) The WP algorithms can be extended to reliability-aware PDN design, because they make the current distribution more evenly across the power pads and on-chip PDN wires and therefore migrate the electromigration effects on the corresponding pads and wires.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art.

Figure 7:
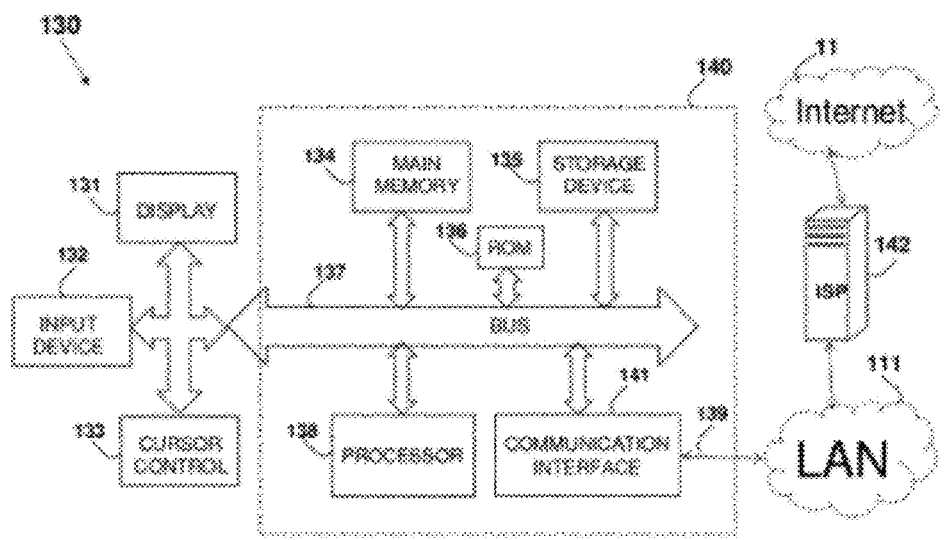
FIG. 7 is a block diagram that illustrates a system including a computer system and the associated Internet connection upon which, an embodiment, or a portion thereof, may be implemented in accordance with some embodiments.

FIG. 7 is a block diagram that illustrates a system 130 including as computer system 140 and the associated Internet 11 connection upon which an embodiment, or a portion thereof, may be implemented. Such configuration is typically used for computers (hosts) connected to the Internet 11 and executing a server or a client (or a combination) software. A source computer such as laptop, an ultimate destination computer and relay servers, for example, as well as any computer or processor described herein, may use the computer system configuration and the Internet connection shown in FIG. 7. The system 140 may be used as a portable electronic, device such as a notebook/laptop computer, a media player (e.g., MP3 based or video player), a cellular phone, a Personal Digital Assistant (PDA), an image processing device (e.g., a digital camera or video recorder), and/or any other handheld computing devices, or a combination of any of these devices. Note that while FIG. 7 illustrates various components of a computer system, it is not intended to represent any particular architecture or manner of interconnecting the components; as such details are not germane to the present invention. It will also be appreciated that network computers, hand-held computers, cell phones and other data processing, systems which have fewer components or perhaps more components may also be used. The computer system of FIG. 7 may, for example, be an Apple Macintosh computer or Power Book, or an IBM compatible PC. Computer system 140 includes a bus 137, an interconnect, or other communication mechanism for communicating information, and a processor 138, commonly in the form of an integrated circuit, coupled with bus 137 for processing information and for executing the computer executable instructions. Computer system 140 also includes a main memory 134, such as a Random Access Memory (RAM) or other dynamic storage device, coupled to bus 137 for storing information and instructions to be executed by processor 138.

Main memory 134 also may be used for storing temporary variables or other intermediate information during execution of instructions to be executed by processor 138. Computer system 140 further includes a Read Only Memory (ROM) 136 (or other non-volatile memory) or other static storage device coupled to bus 137 for storing, static information and instructions for processor 138. A storage device 135, such as a magnetic disk or optical disk, a hard disk drive for reading from and writing to a hard disk, a magnetic disk drive for reading from and writing to a magnetic disk, and/or an optical disk drive (such as DVD) for reading from and writing to a removable optical disk, is coupled to bus 137 for storing information and instructions. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices. Typically computer system 140 includes an Operating System (OS) stored in a non-volatile storage for managing, the computer resources and provides the applications and programs with an access to the computer resources and interfaces. An operating, system commonly processes system data and user input, and responds by allocating and managing tasks and internal system resources, such as controlling and allocating memory, prioritizing system requests, controlling input and output devices, facilitating networking and managing; files. Non-limiting examples of operating systems are Microsoft Windows, Mac OS X and Linux.

The term "processor" is meant to include any integrated circuit or other electronic device (or collection of devices) capable of performing, an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die", or distributed among two or more substrates. Furthermore, various functional aspects of the processor may be implemented solely as software or firmware associated with the processor.

Computer system 140 may be coupled via bus 137 to a display 131, such as a Cathode Ray Tube (CRT), a Liquid Crystal Display (LCD), a fiat screen monitor, a touch screen monitor or similar means for displaying text and graphical data to a user. The display may be connected via a video adapter for supporting, the display. The display allows a user to view, enter, and/or edit information that is relevant to the operation of the system. An input device 132, including alphanumeric and other keys, is coupled to bus 137 for communicating information and command selections to processor 138. Another type of user input device is cursor control 133, such as a mouse, a trackball, or cursor direction keys for communicating direction information and command selections to processor 138 and for controlling cursor movement on display 131. This input device typically has two degrees of freedom in two axes, a first axis (e.g., x) and a second axis (e.g., y), that allows the device to specify positions in a plane.

The computer system 140 may be used for implementing the methods and techniques described herein. According to one embodiment, those methods and techniques are performed by computer system 140 in response to processor 138 executing one or more sequences of one or more instructions contained in main memory 134. Such instructions may be read into main memory 134 from another computer-readable medium, such as storage device 135. Execution of the sequences of instructions contain in main memory 134 causes processor 138 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "computer-readable medium" (or "machine-readable medium") as used herein is an extensible term that refers to any medium or any memory, that participates in providing instructions to a processor, (such as processor 138) for execution, or any mechanism for storing or transmitting information in a form readable by a machine e.g., a computer). Such a medium may store computer-executable instructions to be executed by to processing element and/or control logic, and data which is manipulated by as processing element and/or control logic, and may take many forms including but not limited to, non-volatile medium, volatile medium, and transmission medium. Transmission media includes coaxial cables, copper wire and fiber optics, including the wires that comprise bus 137. Transmission media can also take the form of acoustic or light waves, such as those generated during radio-wave and infrared data communications, or other form of propagated signals (e.g., carrier waves, infrared signals, digital signals, etc.). Common forms of computer-readable media include, for example, as floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 138 for execution. For example, the instructions may initially be carried on a magnetic disk of as remote computer. The remote computer can load the instructions into its dynamic memory and send the instructions over a telephone line using a modem. A modem local to computer system 140 can receive the data on the telephone line and use an infra-red transmitter to convert the data to an infra-red signal. An infra-red detector can receive the data carried in the infra-red signal and appropriate circuitry can place the data on bus 137. Bus 137 carries the data to main memory 134, from which processor 138 retrieves and executes the instructions. The instructions received by main memory 134 may optionally be stored on storage device 135 either before or after execution by processor 138.

Computer system 140 also includes a communication interface 141 coupled to bus 137. Communication interface 141 provides a two-way data communication coupling to a network link 139 that is connected to a local network 11. For example, communication interface 141 may be an Integrated Services Digital Network (ISDN) card or a modem to provide a data communication connection to a corresponding type of telephone line. As another non-limiting example, communication interface 141 may be a local area network (LAN) card to provide a data communication connection to a compatible LAN. For example, Ethernet based connection based on IEEE802.3 standard may be used such as 10/100 BaseT, 1000 BaseT (gigabit Ethernet), 10 gigabit Ethernet (10 GE or 10 GbE or 10 GigE per IEEE Std 802.3ae-2002 as standard), 40 Gigabit Ethernet (40 GbE), or 100 Gigabit Ethernet (100 GbE as per Ethernet standard IEEE P802.3ba), as described in Cisco Systems, Inc. Publication number 1-587005-001-3 (6/99), "Internet working Technologies Handbook", Chapter 7: "Ethernet Technologies", pages 7-1 to 7-38, which is incorporated in its entirety for all purposes as if fully set forth herein. In such a case, the communication interface 141 typically include a LAN transceiver or a modem, such as Standard Microsystems Corporation (SMSC) LAN91C111 10/100 Ethernet transceiver described in the Standard Microsystems Corporation (SMSC) data-sheet "LAN91C111 10/100 Non-PCI Ethernet Single Chip MAC+PHY" Data-Sheet, Rev. 15 (02-20-04), which is incorporated in its entirety for all purposes as if fully set forth herein.

Wireless links may also be implemented. In any such implementation, communication interface 141 sends and receives electrical, electromagnetic or optical signals that carry digital data streams representing various types of information.

Network link 139 typically provides data communication through one or more networks to other data devices. For example, network link 139 may provide a connection through local network 111 to a host computer or to data equipment operated by an Internet Service Provider (ISP) 142. ISP 142 in turn provides data communication services through the world wide packet data communication network Internet 11. Local network 111 and Internet 11 both use electrical, electromagnetic or optical signals that carry digital data streams. The signals through the various networks and the signals on the network link 139 and through the communication interface 141, which carry the digital data to and from computer system 140, are exemplary forms of carrier waves transporting the information.

A received code may be executed by processor 138 received, and/or stored in storage device 135, or other non-volatile storage for later execution. In this manner, computer system 140 may obtain application code in the form of a carrier wave.

Accordingly, an aspect of an embodiment provides, but not limited thereto, a system, method and computer readable medium for power pad placement of power delivery networks (PDN) which is important in, for example, computer-automated-design (CAD) of integrated circuits. It should be appreciated that the related optimization system and method and the related networks, computer systems, internet, and components and functions may be implemented according to the scheme(s) disclosed herein.

Various embodiments or aspects of the invention for example, can be implemented as software in a computing device, or alternatively, on hardware. An exemplary computing device in which an embodiment of the invention, or a portion thereof, can be implemented is schematically illustrated in FIG. 7. Although some aspects may be known, a brief explanation will be provided herein for the convenience of other readers.

Figure 8:
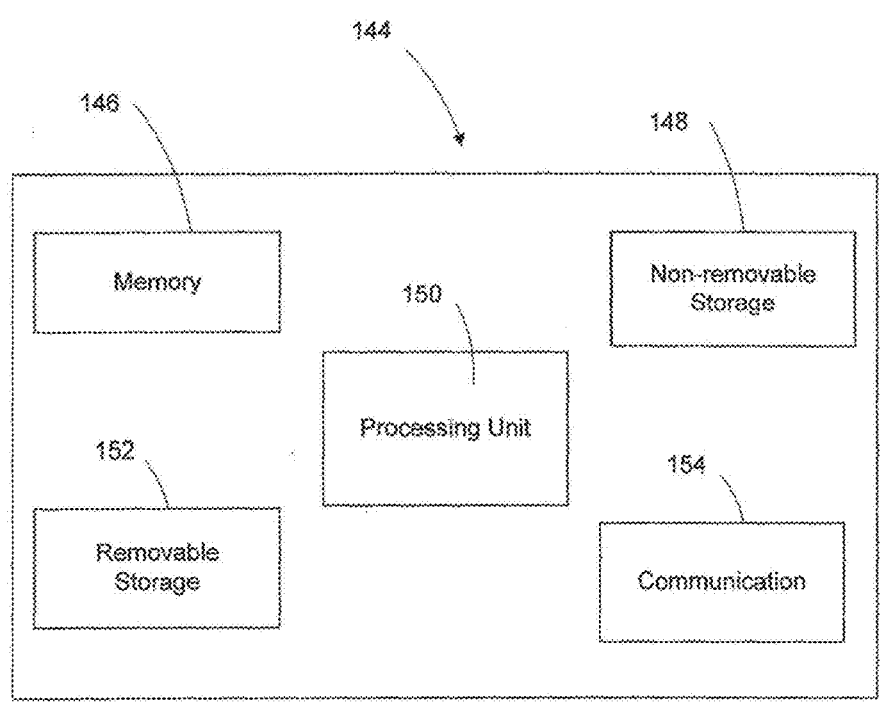
FIGS. 8 and 9 illustrate an exemplary computing device, in which an embodiment of invention, or a portion thereof, can be implemented.

Referring to FIG. 8, in its most basic configuration, computing device 144 typically includes at least one processing unit 150 and memory 146. Depending on the exact configuration and type of computing device, memory 146 can be volatile (such as RAM), nonvolatile (such as ROM, flash memory, etc.) or some combination of the two.

Additionally, device 144 may also have other features and/or functionality. For example, the device could also include additional removable and/or non-removable storage including, but not limited to, magnetic or optical disks or tape, as well as writable electrical storage media. Such additional storage is the figure by removable storage 152 and non-removable storage 148. Computer storage media includes volatile and nonvolatile, removable and non-removable media implemented in any method or technology for storage of information such as computer readable instructions, data structures, program modules or other data. The memory, the removable storage and the non-removable storage are all examples of computer storage media. Computer storage media includes, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the device. Any such computer storage media may be part of, or used in conjunction with, the device.

The device may also contain one or more communications connections 154 that allow the device to communicate with other devices (e.g., other computing, devices). The communications connections carry information in a communication media. Communication media typically embodies computer readable instructions, data structures, program modules or other data in a modulated data signal such as a carrier wave or other transport mechanism and includes any information delivery media. The term modulated data signal means a signal that has one or more of its characteristics set or changed in such a manner as to encode, execute, or process information in the signal. By way of example, and not limitation, communication medium includes wired media such as a wired network or direct-wired connection, and wireless media such as radio, RF, infrared and other wireless media. As discussed above, the term computer readable media as used herein includes both storage media and communication media.

Figure 9:
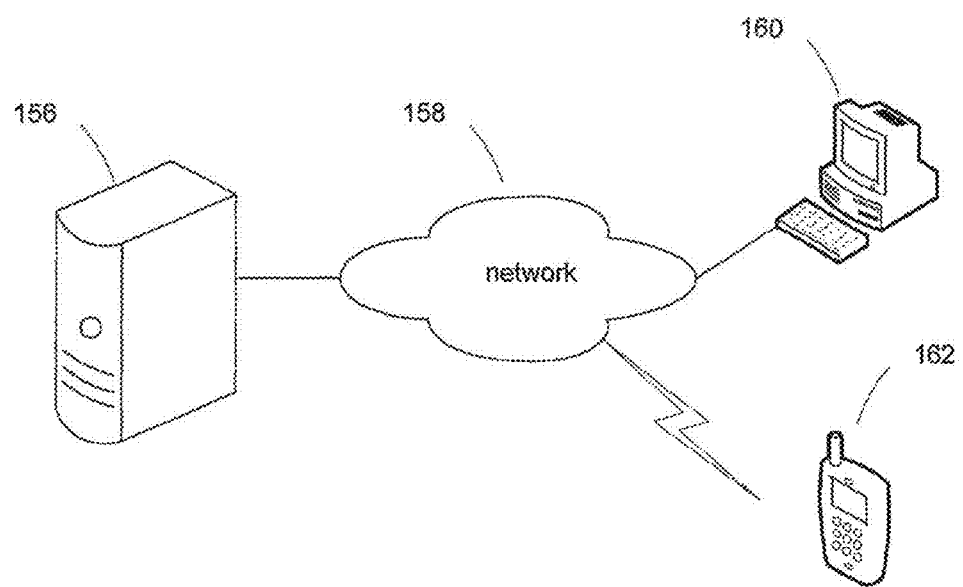

In addition to a stand-alone computing machine, embodiments of the invention can also be implemented on a network system comprising a plurality of computing devices that are in communication with a networking means, such as a network with an infrastructure or an ad hoc network. The network connection can be wired connections or wireless connections. As a way of example, FIG. 9 illustrates a network system in which embodiments of the invention can be implemented. In this example, the network system comprises computer 156 (e.g., a network server), network connection means 158 (e.g., wired and/or wireless connections), computer terminal 160, and PDA (e.g., a smart-phone) 162 (or other handheld or portable device, such as a cell phone, laptop computer, tablet computer, GPS receiver, mp3 player, handheld video player, pocket projector, etc. or handheld devices (or non portable devices) with combinations of such features). The embodiments of the invention can be implemented in anyone of the devices of the system. For example, execution of the instructions or other desired processing can be performed on the same computing device that is anyone of 156, 160, and 162. Alternatively, an embodiment of the invention can be performed on different computing devices of the network system. For example, certain desired or required processing or execution can be performed on one of the computing devices of the network (e.g., server 156), whereas other processing and execution of the instruction can be performed at another computing device (e.g., terminal 160) of the network system, or vice versa. In fact, certain processing or execution can be performed at one computing device (e.g., server 156); and the other processing or execution of the instructions can be performed at different computing devices that may or may not be networked. For example, the certain processing can be performed at terminal 160, while the other processing or instructions are passed to device 162 where the instructions are executed. This scenario may be of particular value especially when the PDA device, for example, accesses to the network through computer terminal 160 (or an access point in an ad hoc network). For another example, software to be protected can be executed, encoded or processed with one or more embodiments of the invention. The processed, encoded or executed software can then be distributed to customers. The distribution can be in a form of storage media (e.g., disk) or electronic copy.

Practice of an aspect of an embodiment (or embodiments) of the invention is presented herein for illustration only and should not be construed as limiting the invention in any way.

An approach of the present invention systems and designs and optimization system and techniques may be based on the tools, programs and operating, systems as discussed throughout this disclosure, such techniques can be applied to various hardware, tools, operating systems, virtual machine, PVM, or executable format.

Figure 10:
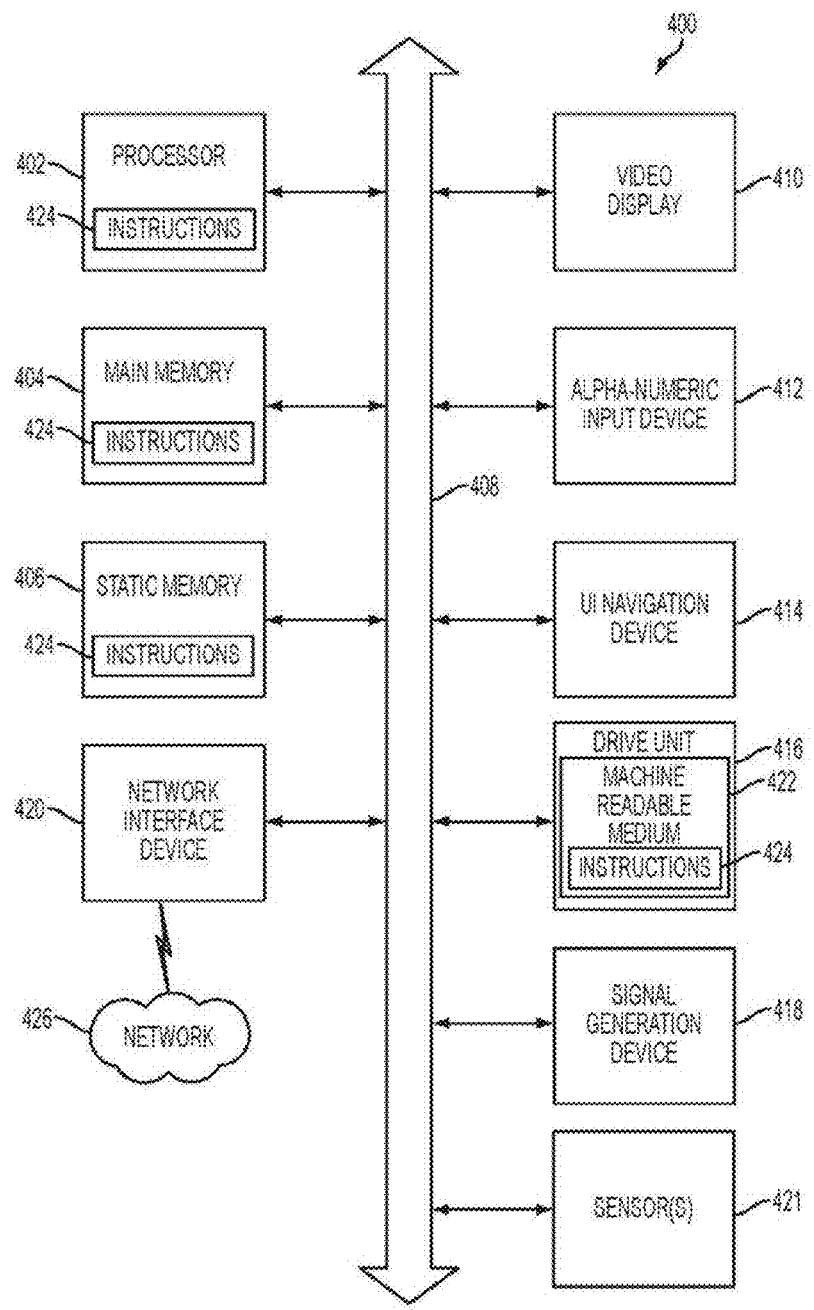
FIG. 10 is a block diagram illustrating an example of a machine upon which one or more aspects of embodiments of the present invention can be implemented.

FIG. 10 is a block diagram illustrating an example of a machine upon which one or more aspects of embodiments of the present invention can be implemented.

FIG. 10 illustrates a block diagram of an example machine 400 upon which one or more embodiments (e.g., discussed methodologies) can be implemented (e.g., run).

Examples of machine 400 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic. (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term circuit is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or more processors or processor-implemented circuits. The performance of certain of the operations can be distributed among the one or more processors not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service (SaaS). For example, at least some of the operations can be performed by a group of computers (as examples of machines including processors), with these operations being accessible via a network (e.g., the Internet) and via one or more appropriate interfaces (e.g., Application Program Interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware a combination of software and a programmable processor), or a combination of permanently and temporarily configured hardware can be a design choice. Below are set out hardware (e.g., machine 400) and software architectures that can be deployed in example embodiments.

In an example, the machine 400 can operate as a stand-alone device or the machine 400 can be connected (e.g., networked) to other machines.

In a networked deployment, the machine 400 can operate in the capacity of either a server or a client machine in server-client network environments. In an example, machine 400 can act as a peer machine in peer-to-peer or other distributed) network environments. The machine 400 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 400. Further, while only a single machine 400 is illustrated, the term machine shall also be taken to include any collection of machines that individually or jointly execute a set or multiple sets) of instructions to perform any one or more of the methodologies discussed herein.

Example machine (e.g., computer system) 400 can include a processor 402 (e.g., a central processing unit (CPU), a graphics processing unit (GPU) or both), a main memory 404 and a static memory 406, some or all of which can communicate with each other via a bus 408. The machine 400 can further include a display unit 410, an alphanumeric input device 412 (e.g., a keyboard), and a user interface (UI) navigation device 411 (e.g. a mouse). In an example, the display unit 410, input device 417 and UI navigation device 414 can be a touch screen display. The machine 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

The storage device 416 can include a machine readable medium 422 on which is stored one or more sets of data structures or instructions 424 (e.g., software) embodying, or utilized by any one or more of the methodologies or functions described herein. The instructions 424 can also reside, completely or at least partially, within the main memory 404, within static memory 406, or within the processor 402 during execution thereof by the machine 400. In an example, one or any combination of the processor 402, the main memory 404, the static memory 406, or the storage device 416 can constitute machine readable media.

While the machine readable medium 422 is illustrated as a single medium, the term "machine readable medium" can include a single medium or multiple media (e.g., a centralized or distributed database, and/or associated caches and servers) that configured to store the one or more instructions 424. The term machine readable medium can also be taken to include any tangible medium that is capable of storing, encoding, or carrying instructions for execution by the machine and that cause the machine to perform any one or more of the methodologies of the present disclosure or that is capable of storing, encoding or carrying data structures utilized by or associated with such instructions. The term machine readable medium can accordingly be taken to include, but not he limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of transfer protocols frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi, IEEE 802.16 standards family known as WiMax), peer-to-peer (P2P) networks, among others. The term transmission medium shall be taken to include any intangible medium that is capable of storing encoding or carrying instructions for execution by the machine, and includes digital or analog communications signals or other intangible medium to facilitate communications of such software.

Practice of an aspect of an embodiment (or embodiments) of the invention is presented herein for illustration only and should not be construed as limiting the invention in any way. An approach of the present invention systems and designs and optimization system and techniques may be based on the tools, programs and operating systems as discussed throughout this disclosure, such techniques can be applied to various hardware, tools, operating systems, virtual machine, PVM, or executable format.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. A method for a physical processor design to minimize a maximum voltage drop in a power delivery network comprising the steps of:
    optimizing placement of a plurality of power pads in the power delivery network; and
    deriving an analytical model for describing a relationship between the maximum voltage drop and a number of the plurality of power pads determined based on the optimized placement of the plurality of power pads,
    wherein the optimizing identifies a plurality of grid locations within the power delivery network, at which the plurality of power pads are placed to minimize the maximum voltage drop,
    wherein the analytical model predicts a minimum number of required power pads and corresponding optimized locations of the plurality of power pads with a given maximum voltage drop budget,
    wherein in the analytical model, a load current density is not uniform, and each of the plurality of power pads serves an area around it in order to accelerate prediction of the minimum number of required power pads,
    wherein the optimizing step is a step of converting a global optimization problem into a local balance problem,
    wherein the global optimization problem is a placement of the plurality of power pads given a plurality of candidate locations within the power delivery network, and the local balance problem is a placement of a single power pad within the power delivery network,
    wherein the placement of the single power pad is based on virtual forces at the plurality of grid locations within the power delivery network,
    wherein the optimizing step configured to allow a subset of the plurality of power pads to move simultaneously in directions defined by normalized virtual forces imposed on them individually,
    wherein virtual forces are defined as a function of physical quantities of the power delivery network, which include current, voltage, temperature, and their gradients, to direct placement of the plurality of power pads, and
    wherein the processor is manufactured based on the optimized placement of the plurality of power pads and the derived analytical model to minimize the maximum voltage drop in the power delivery network.

2. The method according to claim 1, wherein the plurality of power pads are controlled-collapse-chip-connection (C4) pads, and the C4 pads are modeled as individual resistors attached to on-chip grid nodes.

3. The method according to claim 1,
    wherein the optimizing step allows the plurality of power pads to move in reaction to the virtual forces exerted on them by current sources and other power pads in the power delivery network, and the plurality of power pads move until forces are balanced.

4. The method according to claim 3, wherein the plurality of power pads are treated as mobile positive charges, and a voltage field of the power delivery network is treated as a 2D electrostatic field, and
    wherein the plurality of power pads move in directions of the virtual forces exerted on them until forces are balanced.

5. The method according to claim 3, wherein one of the plurality of power pads is moved in a single optimization iteration and only accepts movements that decrease the maximum voltage drop.

6. A non-transitory computer readable medium storing a program causing a computer to execute a method for a physical processor design comprising the steps of:
    optimizing placement of a plurality of power pads in the power delivery network; and
    deriving an analytical model for describing a relationship between the maximum voltage drop and a number of the plurality of power pads determined based on the optimized placement of the plurality of power pads,
    wherein the optimizing identifies a plurality of grid locations with the power delivery network, at which the plurality of power pads are placed to minimize the maximum voltage drop,
    wherein the analytical model predicts a minimum number of required power pads and corresponding optimized locations of the plurality of power pads with a given maximum voltage drop budget,
    wherein in the analytical model, a load current density is not uniform, and each of the plurality of power pads serves an area around it in order to accelerate prediction of the minimum number of required power pads, wherein the optimizing step is a step of converting a global optimization problem into a local balance problem, wherein the global optimization problem is a placement of the plurality of power pads given a plurality of candidate locations within the power delivery network, and the local balance problem is a placement of a single power pad within the power delivery network, wherein the placement of the single power pad is based on virtual forces at the plurality of grid locations within the power delivery network, wherein the optimizing step configured to allow a subset of the plurality of power pads to move simultaneously in directions defined by normalized virtual forces imposed on them individually, wherein virtual forces are defined as a function of physical quantities of the power delivery network, which include current, voltage, temperature, and their gradients, to direct placement of the plurality of power pads, and wherein the processor is manufactured based on the optimized placement of the plurality of power pads and the derived analytical model to minimize the maximum voltage drop in the power delivery network.

7. An optimizing apparatus, for executing a minimization of a maximum voltage drop in a power delivery network, comprising:

a processor configured to perform a method comprising the steps of:

optimizing placement of a plurality of power pads in the power delivery network; and deriving an analytical model for describing a relationship between the maximum voltage drop and a number of the plurality of power pads determined based on the optimized placement of the plurality of power pads, wherein the optimizing identifies a plurality of grid locations with the power delivery network, at which the plurality of power pads are placed to minimize the maximum voltage drop, wherein the analytical model predicts a minimum number of required power pads and corresponding optimized locations of the plurality of power pads with a given maximum voltage drop budget, wherein in the analytical model, a load current density is not uniform, and each of the plurality of power pads serves an area around it in order to accelerate prediction of the minimum number of required power pads, wherein the optimizing step is a step of converting a global optimization problem into a local balance problem, wherein the global optimization problem is a placement of the plurality of power pads given a plurality of candidate locations within the power delivery network, and the local balance problem is a placement of a single power pad within the power delivery network, wherein the placement of the single power pad is based on virtual forces at the plurality of grid locations within the power delivery network, wherein the optimizing step configured to allow a subset of the plurality of power pads to move simultaneously in directions defined by normalized virtual forces imposed on them individually, wherein virtual forces are defined as a function of physical quantities of the power delivery network, which include current, voltage, temperature, and their gradients, to direct placement of the plurality of power pads, and wherein the processor is manufactured based on the optimized placement of the plurality of power pads and the derived analytical model to minimize the maximum voltage drop in the power delivery network; and a memory.

* * * * *

UNITED STATES PATENT AND TRADEMARK OFFICE
CERTIFICATE OF CORRECTION

PATENT NO. : 10,482,210 B2
APPLICATION NO. : 15/000826
DATED : November 19, 2019
INVENTOR(S) : Ke Wang et al.

Page 1 of 1

It is certified that error appears in the above-identified patent and that said Letters Patent is hereby corrected as shown below:

In the Specification

On Column 1, Line 5, before "RELATED APPLICATION," insert:
--This invention was made with government support under Grant Nos. 0916908 and 1116673 awarded by the National Science Foundation and HR0011-13-3-0002 awarded by the Defense Advanced Research Projects Agency (DARPA). The government has certain rights in the invention.--

Signed and Sealed this
Seventeenth Day of March, 2020

Andrei Iancu
*Director of the United States Patent and Trademark Office*